United States Patent

Tierman

[15] 3,638,085
[45] Jan. 25, 1972

[54] THIN FILM CAPACITOR AND METHOD OF MAKING SAME

[72] Inventor: Melvin Tierman, North Adams, Mass.
[73] Assignee: Sprague Electric Company, North Adams, Mass.
[22] Filed: Nov. 13, 1970
[21] Appl. No.: 89,206

[52] U.S. Cl..................317/258, 317/101 A, 317/235 D, 317/261, 29/25.42
[51] Int. Cl. .......................................................H01g 1/02
[58] Field of Search..................317/258, 261, 101 A, 235 D, 317/235 E, 235 F; 29/25.42

[56] References Cited

UNITED STATES PATENTS 3,257,592  6/1966  Maissel.............................317/261 X
3,403,439  10/1968  Bailey................................317/235 D

*Primary Examiner*—E. A. Goldberg
*Attorney*—Connolly and Hutz and Vincent H. Sweeney

[57] ABSTRACT

A thin film capacitor having a counterelectrode of chromium overlaid by gold that completely buries the dielectric layer and protects same from any atmospheric or environmental contamination.

14 Claims, 5 Drawing Figures

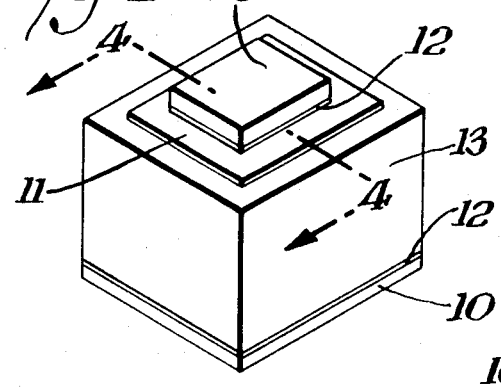
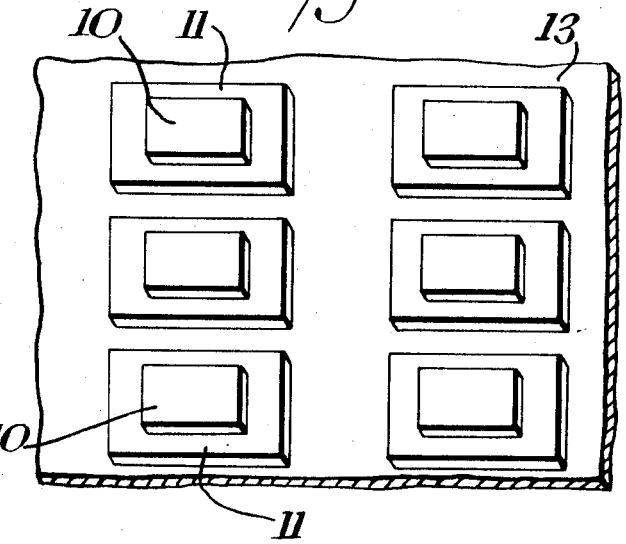
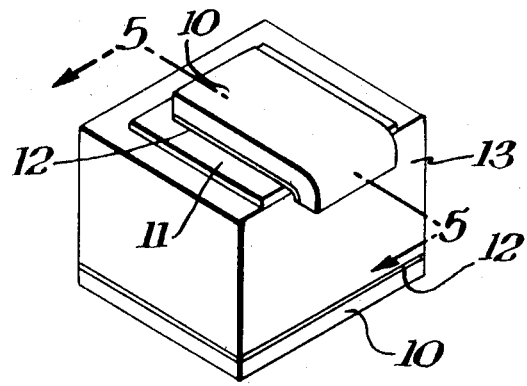
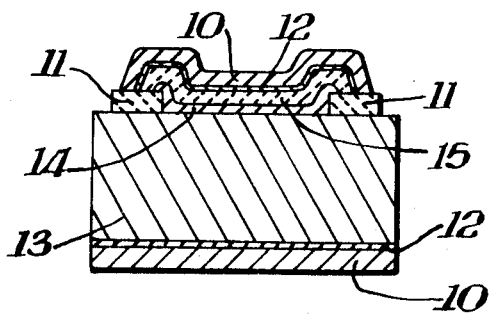
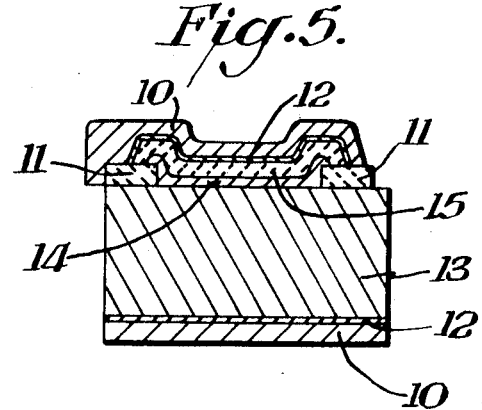

3,638,085

THIN FILM CAPACITOR AND METHOD OF MAKING SAME

BACKGROUND OF THE INVENTION

This invention relates to thin film capacitors and methods of making same, and more particularly to a thin film capacitor having a valve-metal electrode and a dielectric oxide of said electrode that is completely buried and covered by a chromium-gold counterelectrode.

A problem in the prior art use of thin film capacitors has been the possibility of contamination by outside forces which leads to a shortened life and undesirable interfering reactions. This contamination may come from any number of outside sources. One source would be from gases emitted from surrounding electrical components. Another source would be simple fingertip contamination that is picked up on handling the thin film capacitors. Formed dielectric aluminum oxide thin film is particularly susceptible to breakdown when exposed to this contamination.

A problem in the formation of thin film capacitors has been the formation of the counterelectrode. Two basic thin film capacitor types can be classified in terms of their counterelectrodes being nonadherent or adherent. In the nonadherent type a unit comprises a dielectric oxide of the thin film valve-metal electrode sandwiched between the electrode and a metal counterelectrode, usually gold because of its excellent electrical properties. This unit, however, is subject to mechanical breakdown because of poor adhesion of the counterelectrode and is also humidity sensitive because of moisture penetration to the interface of the dielectric and the poorly adherent counterelectrode. These deficiencies exclude the unit from many applications. The adherent type was designed to improve the mechanical properties of the unit by correcting the above deficiencies and in this sense succeeded. The counterelectrode was composed of a "thin" layer (over 200 A.) of chromium, nichrome or titanium followed by the gold. The added metal lent adherence properties to the counterelectrode but had the undesired effect of degrading electrical properties, that is the breakdown voltage decreased and leakage current increased, thereby lowering yield. Another common problem with the batch fabrication of thin film capacitors is the complexity of oxidizing all of the valve-metal surface at once, and the difficulty of maintaining unoxidized contact areas to the underlying tantalum. Additionally, the process of fabricating thin film capacitors necessitates many steps.

Accordingly, it is an object of the present invention to provide a thin film capacitor of the adherent counterelectrode type which is completely protected from possible outside contamination and is more economical to fabricate.

SUMMARY OF THE INVENTION

The present invention is a thin film capacitor formed on a substrate and having a valve-metal oxide dielectric that is completely buried by the counterelectrode.

In a preferred embodiment, a silicon substrate has a layer of silicon dioxide thermally formed thereon, and "windows" etched therein leaving configurations of exposed silicon with its oxide around it. Tantalum is deposited by a sputtering process and then photo defined with said tantalum film completely covering the exposed silicon substrate. The surface of the tantalum is anodized to form a tantalum pentoxide dielectric layer. A counterelectrode is then deposited which completely covers said oxide layer; this counterelectrode is composed of an extremely thin layer of chromium for adhesion purposes, a layer of gold followed by a gold layer plated thereon. The capacitor thus formed has a dielectric layer that is completely shielded from outside contamination. These units may be batch fabricated, and because the tantalum is in direct contact with the silicon substrate, the oxide dielectric layers on all of the units may be formed simultaneously. On another exposed section of the silicon substrate one can deposit another thin film layer of chromium followed by gold to act as an optional metallized contact area. The chromium layer used herein provides the adhesion necessary to improve the mechanical properties of the capacitor, and its extreme thinness makes the properties of the overlying gold dominant, thereby maintaining the excellent electrical properties of that metal.

BRIEF DESCRIPTION OF THE DRAWINGS

FIG. 1 is a perspective view of a completed capacitor unit;

FIG. 2 is a partial view of a substrate showing six unseparated capacitors;

FIG. 3 is a perspective view of a completed capacitor unit having a beam lead thereon;

FIG. 4 is a cross section of the capacitor of FIG. 1, along line 4—4; and

FIG. 5 is a cross section of the capacitor of FIG. 3 having a beam lead thereon. Cross section is along line 5—5.

DESCRIPTION OF THE PREFERRED EMBODIMENTS

While the procedure outlined herein may be performed on a single chip, economy of operation dictates batch fabrication of these capacitors. Therefore, the following more detailed description describes a plurality of capacitor units formed on a silicon wafer.

FIG. 1 shows a capacitor unit of a silicon substrate 13 having a formation of silicon dioxide 11 thereon and a counterelectrode of gold 10 having a thin layer of chromium 12 between said oxide layer 11 and said gold 10. On the bottom of the silicon substrate 13 there is a thin layer of chromium 12 followed by a layer of gold 10 forming an optional metallized contact area. The valve metal electrode and its dielectric oxide layer are buried and are not shown herein.

In FIG. 2 there is shown six unseparated capacitor units out of approximately 1,000 that may be formed on a silicon wafer of 1 inches diameter.

FIG. 3 shows the capacitor of FIG. 1 the only difference being that the gold layer 10 is extended outward to form a beam leaded counterelectrode.

FIG. 4 shows a cross section of the capacitor of FIG. 1. A silicon substrate 13 has a formation of thermally grown oxide 11 with an etched out portion within the formed oxide configuration exposing said silicon substrate 13. A layer of tantalum 14 is deposited thereon and covers the etched out portion and extends upward onto the top of the oxide enclosure 11; the surface of the tantalum layer 14 is anodized giving tantalum pentoxide 15, the dielectric layer. A thin film of chromium 12 is then evaporated over the entire tantalum pentoxide layer 15, followed by a layer of gold 10. The gold layer 10 is an evaporated film of gold followed by gold plating thereon.

The batch fabrication of these capacitors is carried out by first thermally growing silicon dioxide on a silicon wafer; then through masking and etching, small "windows" are formed in the oxide, exposing the silicon through these "windows"; the valve metal tantalum is then sputtered over the entire area thereon to a thickness of about 3,000 A. and little islands of tantalum are formed by etching, said islands covering at least all of the then exposed silicon substrate. These tantalum "islands" are anodized forming tantalum pentoxide. The anodization is done with phosphoric acid or some other suitable formation electrolyte at an anodization voltage of around 190 v. A very thin layer of chromium is then evaporated over this entire surface of the silicon substrate followed by the evaporation of a thin layer of gold. A photoresist mask is then placed in the channels and the gold layer is then gold plated on the "island" areas. After removal of the masking, the thin film layer of gold and chromium that is beyond the plated gold islands is then etched away leaving said islands surrounded by the silicon dioxide. A grid pattern is then formed and channels are etched in the silicon dioxide between each unit. The front of the wafer is then wax mounted on a ceramic disc for protection while the wafer is thinned on the bottom by etching the silicon away. Silicon is not a highly conductive material, so it is thinned to form a sheet not more than 2 mils thick and to reduce its resistivity. This makes the silicon conductive enough to suit the purpose of the present invention—that is, conductive enough to allow conductivity through this substrate to the tantalum electrode. A highly doped silicon can also be used to reduce the resistivity therein. At this point, thin film layers of chromium and gold may optionally be evaporated on the bottom thereon for contact areas and the wafer is removed from the ceramic disc, and any residual wax is then removed with a solvent. The wafer is then scribed with a diamond scriber from the front and the units are broken and the capacitors separated.

Over 1,000 capacitors can be produced on one 1⅜-inches diameter silicon wafer. Each capacitor is approximately 0.020×0.020×0.004". The capacitance of these units is approximately 100 pf. and the dissipation factor is 0.2 percent. These units have $2\times10^{-10}$ a. leakage at 125 v. 50 WVDC rating (190 v. DC formation). The dielectric so formed is approximately 2,800 A. thick, resulting in a decrease of approximately 1,400 A. of the tantalum film.

A capacitor having a counterelectrode of gold that extends out to form a beam leaded contact is shown in FIG. 5. This figure is basically the same as described in FIG. 4 except that when the chromium film 12 and gold film 10 are evaporated on the surface and followed by the gold plate, the gold plate extends beyond the island and onto the silicon substrate area beyond the oxide enclosure. When the silicon substrate 13 is thinned, as previously described herein, the silicon directly under the extending gold plate is then etched completely away exposing the cantilevered portion of gold plate. This unit also completely buries the dielectric but the counterelectrode has a beam leaded contact area. The rest of the process, including the optional metallization of the electrode to the bottom of the silicon layer, is carried out in the same manner as was previously described herein.

The above embodiment describes the use of tantalum as the valve metal; other valve metals that can be used include aluminum, hafnium, niobium, titanium and zirconium.

Also, the preferred embodiment speaks of a silicon substrate, but other conductive substrates can be used with similar but less desirable results. Some of these include germanium and aluminum another valve metals. In these cases it may be more desirable to form a nitride configuration in situ on the conductive substrate instead of its oxide. Any well-known passivating technique may be employed to form the nitride configuration.

While the preferred embodiment speaks of forming individual capacitor units, it should be understood that one may form such a capacitor on a silicon substrate that is part of an integrated circuit. Other electrical components that may appear thereon include transistors, resistors, diodes and so forth.

Since it is obvious that many changes and modifications can be made in the above described details without departing from the nature and spirit of the invention, it is to be understood that the invention is not limited to said details except as set forth in the appended claims.

What is claimed is:
1. A thin film capacitor comprising a conductive substrate; a configuration of in situ formed dielectric compound of said substrate on a surface of said substrate and having an area of the substrate exposed within the configuration; a thin film deposit of a valve-metal electrode over at least all of said surface exposed within said configuration, said film being in electrical contact with the substrate; a dielectric layer of the oxide of said valve-metal electrode formed on the surface of said film that faces away from the conductive substrate; and a counterelectrode completely covering said valve-metal oxide layer, and extending beyond same.

2. The capacitor of claim 1 wherein the conductive substrate is silicon.

3. The capacitor of claim 2 having a metal contact attached to an exposed surface of the silicon substrate.

4. The capacitor of claim 1 wherein the valve metal is tantalum.

5. The capacitor of claim 1 wherein the valve metal is aluminum.

6. The capacitor of claim 1 wherein said counterelectrode is a thin film of chromium covered by a thin film of gold that is plated with gold.

7. The capacitor of claim 1 having a beam lead extending from said counterelectrode.

8. The capacitor of claim 1 wherein said counterelectrode is a film of a nickel-chromium alloy covered by a layer of gold which is plated with gold.

9. The capacitor of claim 1 wherein said substrate is silicon, said dielectric compound is silicon dioxide, said valve metal is tantalum, said dielectric layer is tantalum pentoxide, and said counterelectrode is a chromium film covered by a gold film plated with gold.

10. A method of fabricating a thin film capacitor including the steps of:
providing a conductive silicon substrate with a configuration of in situ formed oxide around the top thereof; applying a thin film of a valve metal onto at least the entire substrate surface within said configuration; forming a layer of the oxide of said valve metal on the exposed surface of said valve metal film; and burying said layer under a counterelectrode.

11. The method of claim 10 in which the substrate is relatively thick and after the fabricating is reduced in thickness to form a sheet not more than about 2 mils thick.

12. The method of claim 10 having a metal contact attached to a surface of said substrate.

13. The method of claim 10 wherein the substrate is subdivided into individual pieces, each comprising at least one of said configurations.

14. The method of claim 13 wherein the subdividing is effected in a manner that leaves a beam lead projecting from the counterelectrode of a piece.

* * * * *